UNITED STATES PATENT OFFICE.

JOHN A. SCHMIDTKE, OF CALGARY, ALBERTA, CANADA.

TIRE-FILLING COMPOSITION.

1,376,973. Specification of Letters Patent. Patented May 3, 1921.

No Drawing. Application filed April 22, 1920. Serial No. 375,886.

*To all whom it may concern:*

Be it known that I, JOHN A. SCHMIDTKE, a citizen of the United States, residing at Calgary, Province of Alberta, Canada, have invented a new and useful Tire-Filling Composition.

The object of my invention is to produce a material that may be introduced into an outer casing of the form now in general use upon automobiles having pneumatic tires, and which, replacing the air in such tires will be resilient, light in weight, and durable in service.

I am aware that such tire fillers have been known and used previously to my invention, but the composition of matter herein disclosed has marked advantages of extreme light weight, extreme flexibility and resiliency, in combination with longer life under the constantly changing fiber stresses incident to such use, and cheaper production.

My composition for such use consists of the following ingredients, combined in substantially the proportions stated, to wit:

| | |
|---|---|
| Vegetable oil | 74% |
| Magnesium oxid | 2.2% |
| Ultramarine | 2.2% |
| Litharge | 2.2% |
| Oakum | 1.9% |
| Chlorid of sulfur | 17.5% |

I have discovered that the use of the various ingredients specified above in combination with the specified percentage of oakum results in the desirable advantages above mentioned.

In preparation, the ingredients of my composition are thoroughly mixed, and then molded into the desired form.

In use the molded product is firmly incased within the outer casing commonly used with pneumatic tires, thus eliminating the inner tube and compressed air.

Having disclosed my invention so that others skilled in the art may be enabled to compound and to use the same, what I claim as new, and desire to secure by Letters Patent is:

A tire filler comprising the following ingredients in proportions substantially as set forth; vegetable oil 74%; magnesium oxid 2.2%; ultramarine 2.2%; litharge 2.2%; oakum 1.9%; chlorid of sulfur 17.5%.

JOHN A. SCHMIDTKE.

Witnesses:
S. O'MEARA,
THOS. MUNN.